Figure 1:
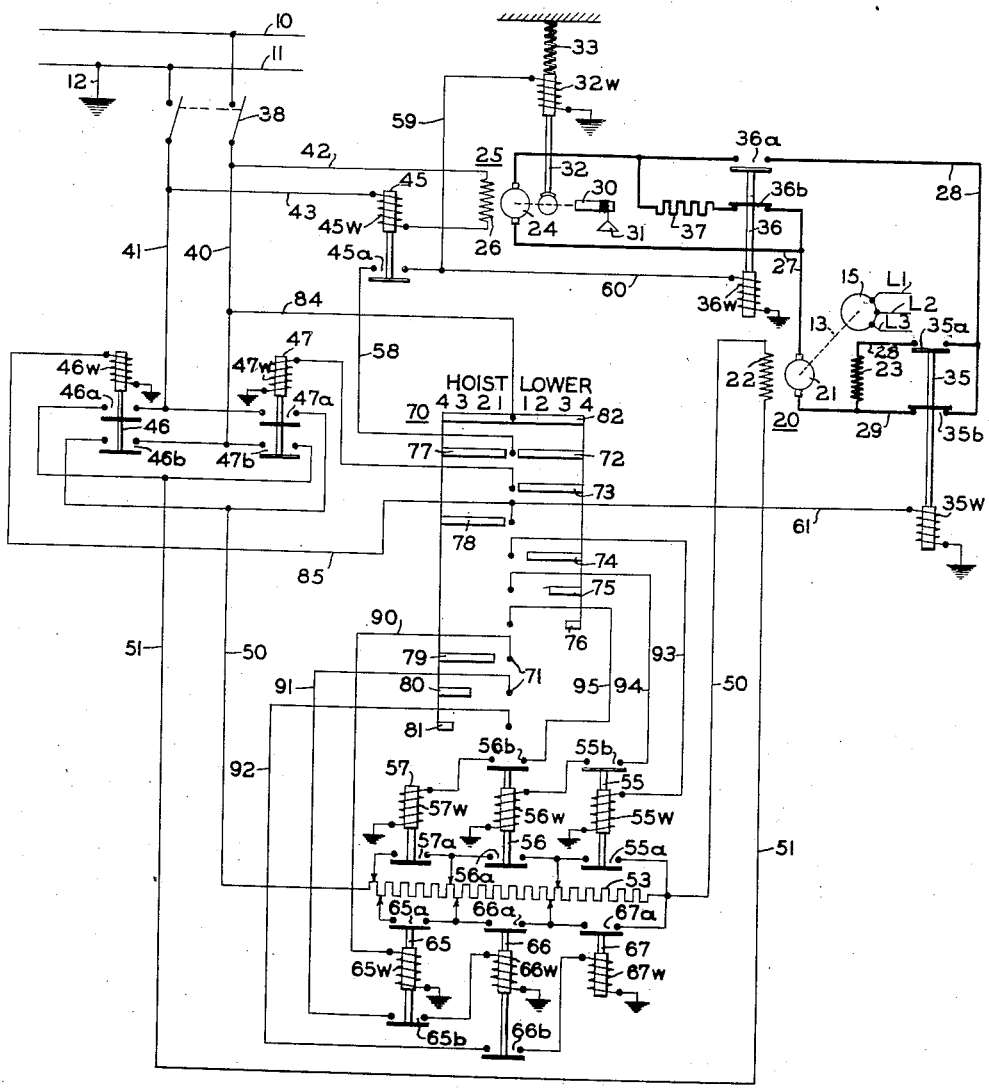

Oct. 6, 1942.　　　　D. C. WRIGHT　　　　2,298,188
MOTOR CONTROL SYSTEM
Filed May 20, 1941

INVENTOR.
DAVID C. WRIGHT
BY
his ATTORNEYS

Patented Oct. 6, 1942

2,298,188

UNITED STATES PATENT OFFICE 2,298,188

MOTOR CONTROL SYSTEM

David C. Wright, Euclid, Ohio, assignor to The Electric Controller & Manufacturing Company, Cleveland, Ohio, a corporation of Ohio Application May 20, 1941, Serial No. 394,321

7 Claims. (Cl. 172—152)

This invention relates to electrical control systems and more particularly to systems for controlling the operations of direct current motors which are utilized as the driving motors for hoists which are subject to overhauling loads. The usual shunt or separately excited motors, when energized from a constant voltage source, have disadvantages during hoisting operations of industrial crane hoists. For example, when a shunt or separately excited motor is energized from a constant voltage generator and used in hoisting service, the hoisting speeds as well as the lowering speeds are approximately constant for any given setting of the speed control device regardless of the size of the load. However, for hoisting loads it is undesirable to have constant speed characteristics. In fact, a hoisting speed inversely proportional to the size of the load is desired. Therefore, these types of motors have not been used to a great extent for operating industrial crane hoists.

The well-known Ward Leonard system, using separately excited motors, has been used for hoisting and lowering of power-shovels and the like, wherein little or no control of lowering speeds is required. In a Ward Leonard system for such purposes the generator has a separately excited shunt field and a self-excited differentially connected series field and the motor has a separately excited shunt field. A direct current generator of this type, when driven at a uniform speed and connected to supply power to the separately excited motor, causes the motor to have desirable speed-torque characteristics for hoisting loads which can be made to approach those of a direct current series motor connected to a fixed voltage generator. The Ward Leonard system, in spite of its excellent hoisting characteristics, has not been used generally for industrial crane hoists because of its uncontrollable lowering characteristics. For example, the speed-torque characteristics of the motor of such a Ward Leonard system are not suitable when heavy overhauling loads must be lowered slowly and at controlled speeds.

When lowering overhauling loads, the motor must supply a retarding torque and to do so it operates as a generator tending to generate a higher voltage than the variable voltage generator to which its armature is electrically connected. The voltage of the separately excited motor when acting as a generator in retarding the load opposes the voltage of the variable voltage generator and the current generated by the motor tends to reverse the current through the series field of the generator. This weakens the differential effect of the two generator fields and causes the generator to develop a continuously cumulative higher voltage. Consequently, the motor must increase its voltage in order to continue to generate a voltage greater than the voltage of the generator and tends to run at excessive speeds and does not retard the overhauling load sufficiently. Therefore, although the differential field of a variable voltage generator improves the speed-torque characteristics in hoisting, it renders the lowering characteristics of the separately excited motors unstable and consequently such generator and motor combinations have not been used in crane hoisting service where accurate speed control in lowering is essential.

The principal object of the present invention is to provide a control for a Ward Leonard system by which desirable lowering characteristics are obtained while retaining all of its desirable hoisting characteristics.

Another object is to provide a control system for a separately excited shunt motor so that it has satisfactory speed-torque characteristics both in lowering and hoisting loads.

A more specific object is to provide a system for controlling the operation of a variable voltage generator and separately excited motor combination for use in hoisting service in which desirable speed-torque characteristics are obtained both for lowering and hoisting.

A correlative object is to provide a control system for a variable voltage generator and separately excited motor in which the motor may safely lower overhauling loads at controlled speeds.

Another object is to provide a Ward Leonard system employing a variable voltage generator having a separately excited field winding and a differentially connected series field winding in which a separately excited shunt motor energized by the generator has suitable hoisting and lowering characteristics.

Figure 2:
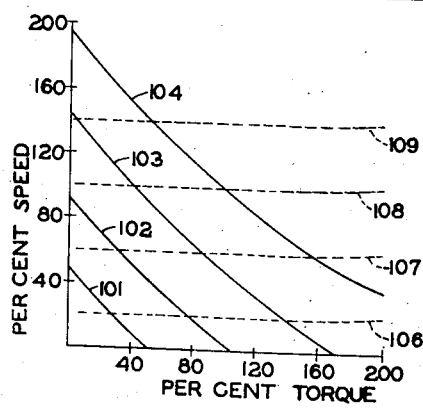

Other objects and advantages will become apparent from the following specification wherein reference is made to the drawing, in which:

Fig. 1 is a complete wiring diagram illustrating a preferred embodiment of the present invention, and Fig. 2 is a graph illustrating the speed-torque characteristics of the separately excited shunt motor of the invention.

In accordance with this invention, a variable voltage generator having a separately excited field winding and a differentially connected series field winding is connected to supply power to a separately excited hoist motor. A normally-closed switch is connected across the differentially connected series field winding. During hoisting, the normally closed switch is open and the generator has the common drooping voltage-current characteristics. When lowering, the spring-closed switch is closed and the series field is disconnected causing the generator to have shunt characteristics. The strength of the separately excited field may then be varied and several different lowering speeds obtained which are approximately constant regardless of the size of the load.

Direct current is supplied to the control system from a suitable source (not shown) through power conductors 10 and 11, one of which, shown as the conductor 11, is grounded at 12.

An alternating current motor 15 is connected for energization from a source of alternating current (not shown) through the conductors L1, L2 and L3. The motor 15 is arranged to drive a direct current generator 20 at a substantially constant speed through a shaft 13. Any other suitable means may be used to drive the generator 20. The generator 20 has an armature winding 21, a separately excited field winding 22, and a differentially connected series field winding 23. The armature winding 21 of the generator 20 is adapted to be connected through the conductors 27 and 28 to an armature winding 24 of a direct current motor 25 having a separately excited field winding 26. The motor 25 is drivingly connected to a hoisting drum 30 on which a cable is wound from which is suspended a load 31. A spring-applied, electromagnetically-released friction brake 32 is provided for the motor 25.

Interposed in the conductor 28 are normally open contacts 35a of an electromagnetic contactor 35 which has an operating winding 35w and normally closed contacts 35b. The contacts 35b normally complete a shunt circuit around the series field winding 23 and the normally open contacts 35a through a conductor 29. Also interposed in the conductor 28 are normally open contacts 36a of an electromagnetic contactor 36 which has an operating winding 36w and normally closed contacts 36b. The contacts 36b normally complete a dynamic braking circuit across the armature winding 24 of the motor 25 through a dynamic braking resistor 37. The brake 32 is normally applied by a spring 33 and is released upon energization of an operating winding 32w.

Direct current for the separately excited field winding 26 of the motor 25 and the separately excited field winding 22 of the generator 20 is obtained from the conductors 10 and 11 through a knife switch 38. The switch 38 when closed connects the conductors 10 and 11 to the conductors 40 and 41 respectively. The field winding 26 is connected across the conductors 40 and 41 through the conductors 42 and 43. In series with the conductor 43 is an operating winding 45w of an electromagnetic relay 45 having normally open contacts 45a.

Electromagnetic contactors 46 and 47 are arranged to control the polarity of the separately excited field winding 22. The contactor 46 has an operating winding 46w and normally open contacts 46a and 46b. The contactor 47 has an operating winding 47w and normally open contacts 47a and 47b. The contactor 46 when closed connects the conductors 41 and 40 to the conductors 51 and 50 respectively, and the contactor 47 when closed connects the conductors 41 and 40 to the conductors 50 and 51 respectively. The conductors 50 and 51 are connected to the terminals of the field winding 22 and a resistor 53 is interposed in the conductor 50.

The resistor 53 is divided into sections and the several sections are arranged to be selectively short circuited in the lowering direction of operation by means of electromagnetic contactors 55, 56 and 57. The contactor 55 has an operating winding 55w and normally open contacts 55a and 55b; the contactor 56 has an operating winding 56w and normally open contacts 56a and 56b; and the contactor 57 has an operating winding 57w and normally open contacts 57a. Similarly, sections of the resistor 53 of the same or different ohmic value than those controlled by the contactors 55, 56 and 57 are arranged to be successively short circuited in the hoisting direction of operation by means of electromagnetic contactors 65, 66 and 67. The contactors 65, 66 and 67 are similar to the contactors 55, 56 and 57 respectively. The contactor 65 has an operating winding 65w and normally open contacts 65a and 65b; the contactor 66 has an operating winding 66w and normally open contacts 66a and 66b; and the contactor 67 has an operating winding 67w and normally open contacts 67a. The ohmic resistance of the respective sections of the resistor 53 which each of the contactors 55, 56, 57, 65, 66, and 67 is adapted to short circuit is independently adjustable as indicated.

To selectively control the operation of the various electromagnetic contactors a multi-position master switch 70 is provided. The master switch 70 comprises a plurality of circuit terminals 71, some of which, in the lowering positions, are movable into engagement with contact segments 72 to 76 inclusive and, some of which, in the hoisting positions, are movable into engagement with contact segments 77 to 81 inclusive. In addition, a contact segment 82 engages one of the circuit terminals 71 in all positions. All of the contact segments 72 to 82 inclusive are electrically interconnected.

A more complete understanding of the control system of this invention may be had from a consideration of the following description of its operation in which it is assumed that the motor 15 is driving the generator 20 at a substantially constant speed. Closure of the switch 38 causes energization of the field winding 26 of the motor 25 by completing a circuit from the conductors 10 and 11 through the conductors 40 and 41, and the conductors 42 and 43. Closure of the switch 38 also connects the contact segment 82 of the master switch 70 to the ungrounded conductor 10 through the conductors 40 and 84 and one of the circuit terminals 71.

Movement of the master switch 70 in the hoisting direction results in energization of the field winding 22 of the generator 20 at a polarity such as to cause its voltage to drive the motor 25 in a direction to hoist the load 31. The field winding 22 is energized through the resistor 53 and the conductors 50 and 51 upon closure of the contacts 46a and 46b of the contactor 46 due to the energization of its operating winding 46w. The winding 46w is energized over a circuit extending from the conductor 10 through the switch 38, the conductors 40 and 84, one of the circuit terminals 71, the contact segment 82, the contact segment 70, another of the circuit terminals 71, a conductor 85, and the winding 46w to ground. In order to make the drawing as clear as possible, one terminal of each of the contactor operating windings and the brake operating winding is shown connected to ground as is the conductor 11.

Energization of the field winding 26 of the motor 25 causes operation of the relay 45 and consequent closure of the contacts 45a. Closure of the contacts 45a partially completes an operating circuit for the winding 32w of the brake 32, and movement of the master switch from the off position in the hoisting direction completes the operating circuit for the brake winding 32w from the conductor 84, through the contact segments 62 and 77, a conductor 58, the contacts 45a, a conductor 59, and the winding 32w to ground. Energization of the winding 32w causes compression of the spring 33 and release of the brake 32. Closure of the contacts 45a and movement of the master switch from the off position in the hoisting direction also completes an energizing circuit for the winding 36w of the contactor 36 from the segment 77 through the conductor 58, the contacts 45a, a conductor 60, and the winding 36w to ground. The contactor 36 in response to the energization of its winding 36w opens its contacts 36b to interrupt the dynamic braking circuit through the resistor 37 and closes its contacts 36a to partially complete a circuit through the conductor 28 between the generator 20 and the motor 25.

Movement of the master switch in the hoisting direction also completes an energizing circuit for the winding 35w of the contactor 35 from the contact segment 78 through a conductor 61 and the winding 35w to ground. The contactor 35 in response to the energization of its operating winding 35w closes its contacts 35a and opens its contacts 35b. Closure of the contacts 35a completes the motor-generator circuit through the differentially connected series field winding 23 and the conductor 28, and opening of the contacts 35b interrupts the shunt circuit around the series field winding 23 through the conductor 29.

With the master switch 70 in the first hoisting position all of the resistance 53 is effective to maintain the strength of the field winding 22 at a low value and the motor 25 operates to hoist the load 31 along a speed-torque characteristic such as the curve 101 of Fig. 2. It will be seen that if the load 31 is large, the hoisting speed is extremely slow, whereas if the load is small, the hoisting speed is somewhat increased. The drooping nature of the curve 101 is due to the differential effect of the series field winding 23.

The hoisting torque of the motor 25 may be increased above that obtainable in the first position by moving the master switch 70 to the second, third, or fourth hoisting positions, which causes selective operation of the contactors 65, 66, and 67. Movement of the master switch 70 to the second hoisting position causes the short circuiting of a section of the resistor 53 by the contactor 65, movement to the third hoisting position causes short circuiting of an additional resistance section by the contactor 66, and movement to the fourth hoisting position causes short circuiting of another section of the resistor 53. Each time a resistance section is short circuited the excitation of the field winding 22 is increased and consequently the voltage of the generator 20 is increased. The energizing circuit for the winding 65w of the contactor 65 is completed in the second, third, and fourth hoisting positions from the contact segment 79 through a conductor 90; the energizing circuit for the winding 66w of the contactor 66 is completed in the third and fourth hoisting positions from the contact segment 80 through a conductor 91 and the now closed contacts 65b; and the energizing circuit for the winding 67w is completed in the fourth hoisting position from the contact segment 81 through a conductor 92 and the now closed contacts 66b. In order to simplify the disclosure, a simple interlock control for the field controlling contactors has been shown. It will be understood by those skilled in the art that suitable time delay devices may be incorporated in the circuit to delay the successive resistance shunting operations of the contactors.

Closure of the contactor 65 increases the field strength of the generator 20 so that the motor 25 operates along a speed-torque characteristic such as the curve 102 of Fig. 2. When the contactors 65 and 66 are both closed the motor 25 operates along a curve such as 103. When all three of the contactors 65, 66 and 67 are closed the field strength of the generator 20 is at a maximum and the motor 25 operates along a curve such as 104. The drooping nature of the speed torque characteristics 101 to 104, inclusive, is due to the differential effect of the self-excited series field 23.

It is thus seen that the hoisting speed of the motor 25 can within certain definite limits be selected by the operator, and that if the load 31 is extremely small, hoisting speeds in excess of full load speed are obtainable, whereas if the load 31 is very large only slow hoisting speeds are obtainable. This type of speed-torque characteristic has been found to be the most desirable for hoisting service and is comparable to the speed-torque characteristics of direct current series motors energized from fixed voltage generators.

If a generator such as the generator 20 had its differentially connected series field winding 23 connected in the motor-generator circuit when its separately excited field 22 were energized at such a polarity as to cause the motor 25 to rotate in a direction to lower the load 31, excessive lowering speeds would result if the load 31 were great enough to overhaul the motor 25 and the associated gearing and shafting. This is because when the motor 25 is overhauled it tends to operate as a generator and supply voltage to the generator 20 and drive the generator 20 as a motor. Since the series field winding 23 is connected differentially with respect to the separately excited field winding 22, when current from the motor 25 flows through the field 22, the field 23 is reversed and instead of being differential with respect to the field 22 it is cumulative. Cumulative action of the two fields 22 and 23 causes an increase in the voltage of the generator 20. This has the immediate effect of causing the motor 25 to increase its speed in an attempt to generate a voltage greater than that of the generator 20. Consequently, during lowering, the motor 25 tends to run at excessive speeds when subjected to overhauling loads if the series field 23 is permitted to be energized.

In accordance with the present invention the foregoing lowering defects are eliminated and desirable lowering characteristics are obtained while retaining the desirable hoisting characteristics. When the master switch 70 is moved to the first position in the lowering direction the brake 32 is released and the contactor 36 energized as in hoisting except that the contact segment 72 completes the energizing circuit to the windings 32w and 36w instead of the contact segment 71. In the lowering positions the contact segment 73 completes an obvious energizing circuit for the operating winding 47w of the contactor 47. As a result of the energization of the winding 47w, the contactor 47 closes its contacts 47a and 47b to connect the conductors 40 and 41 to the conductors 51 and 50 respectively. The field winding 22 is now of such polarity that the voltage of the generator 20 causes the motor 25 to operate to lower the load 31.

A circuit is not completed to the winding 35w of the contactor 35 when the master switch 70 is moved to the lowering positions and consequently the contacts 35a maintain the series field winding 23 unenergized and the normally closed contacts 35b complete the generator-motor circuit through the conductor 29 around the field winding 23. As a result the speed-torque characteristic of the motor 25 in the first lowering position is a curve such as the curve 106 of Fig. 2. Curve 106 is substantially a straight line and is nearly parallel with the torque axis. A substantially constant lowering speed is obtained regardless of the weight of the load, although extremely heavy loads are lowered somewhat faster than lighter loads. If the load 31 is overhauling, the motor 25 becomes a generator and drives the generator 20 as a motor. Since the series field winding 23 is not in the circuit, the voltage of the generator 20 is predetermined depending upon the position of the master switch 70, and as soon as the voltage of the motor 25 exceeds that of the generator 20 a braking action takes place to slow down the lowering speed of the load 31.

Increased lowering speeds for both power lowering and regenerative braking lowering can be obtained by moving the master switch 70 to the second, third, or fourth position in the lowering direction. In the second lowering position a circuit is completed from the contact segment 74 through a conductor 93 to the winding 55w of the contactor 55. As a result of the energization of the winding 55w the contactor 55 closes its contacts 55a to short circuit a section of the resistor 53, thus increasing the voltage applied to the field winding 22 and causing the motor to operate at increased speed along the curve 107. Closure of the contacts 55b completes a circuit from the circuit terminal 71 engageable by the contact segment 75 through the conductor 94 to the winding 56w of the contactor 56, and if the master switch 70 is now moved to the third position in the lowering direction or if it is already in the third position, the contactor 56 closes to short circuit another section of the resistor 53. The motor now lowers the load 31 along the curve 108 of Fig. 2.

A further increase in lowering speed may be obtained by moving the master switch to the forth lowering position completing a circuit from the contact segment 76 through a conductor 95 and the now closed contacts 56b to the winding 57w. As a result of the energization of the winding 57w, the contacts 57a close to short circuit a further section of the resistor 52 and apply full voltage to the field winding 22. The speed-torque characteristic of the motor 25 is now shown by the curve 109.

The operator thus has complete control of the lowering speed of the motor 25 regardless of whether the load is overhauling or not. The motor 25 safely lowers overhauling loads at controlled speeds.

If at any time during movement of the load 31 the shunt field 26 of the motor 25 is reduced in strength, the winding 45w permits drop out of the relay 45 and consequent opening of the contacts 45a. Opening of the contacts 45a deenergizes the winding 32w of the brake 32 which is thereupon applied by the spring 33 to stop the motor 25. Concurrently, the winding 36w of the contactor 36 is deenergized and the contactor 36 operates to interrupt the motor-generator circuit by opening the contacts 36a and to close the dynamic braking circuit through the resistor 37 by closing the contacts 36b.

Movement of the master switch 70 to the off position also interrupts the circuits to the windings 32w and 36w to slow down and stop the motor 35 by a combination of friction and dynamic braking.

I claim:

1. In a motor control system, the combination with a differentially compound generator and a separately excited shunt motor connected in a loop circuit and means to permit regenerative braking of said motor through said generator, of a means to render the series field of the generator ineffective to change substantially the total magnetic flux of the generator during said braking while maintaining the shunt field of the motor effective for useful braking.

2. In a motor control system in which a shunt motor is subject to overhauling loads, the combination with said motor, a generator connected in a closed circuit with said motor, said generator having a separately excited field winding and a differentially connected series field winding, and means for selectively varying the polarity of said separately excited field winding of the generator to reverse the torque of said motor, selectively, of control means operable for rendering said series field operative and inoperative selectively, whereby the speed of said motor is controllable when it is being rotated by the overhauling load.

3. In a system of motor control for raising and lowering a load, the combination with a separately excited motor drivingly connected to said load, a generator connected in a closed circuit with said motor, said generator having a separately excited field winding and a differentially connected series field winding, and means for selectively varying the polarity of said separately excited field winding of the generator to cause said motor to selectively raise and lower said load, of means operable for rendering said series field operative and inoperative selectively, whereby said motor is controllable while both hoisting and lowering said load.

4. A motor control system according to claim 2 characterized in that said separately excited field winding is controlled by a master switch and said control means is operable to render the series field inoperative by movement of said master switch to positions to reverse the polarity of the separately excited winding.

5. A motor control system according to claim 2 characterized in that said control means renders said series field operative by connecting the series field winding in series with, and inoperative by completely disconnecting the said series field winding from, the said closed circuit.

6. The combination with a hoist motor control system comprising a variable voltage system including a generator and a motor energized thereby, said generator having a shunt field winding and a differentially connected series field winding and said motor having a shunt field winding, and means for controlling the polarity of one of said shunt field windings for effecting hoisting and lowering operations by said motor, of switching means for rendering the generator series field winding effective during hoisting operations and for rendering said generator series field winding ineffective during lowering operations.

7. In a motor control system, the combination with a differentially compound generator and a shunt motor connected in a loop circuit and means to permit regenerative braking of said motor through said generator, of a means to render the series field of the generator ineffective to change substantially the total magnetic flux of the generator during said braking while maintaining the shunt field of the motor effective for useful braking.

DAVID C. WRIGHT.